A. K. KUSEBAUCH.
GEAR SHIFTING MECHANISM.
APPLICATION FILED NOV. 25, 1914.
1,159,505.
Patented Nov. 9, 1915.
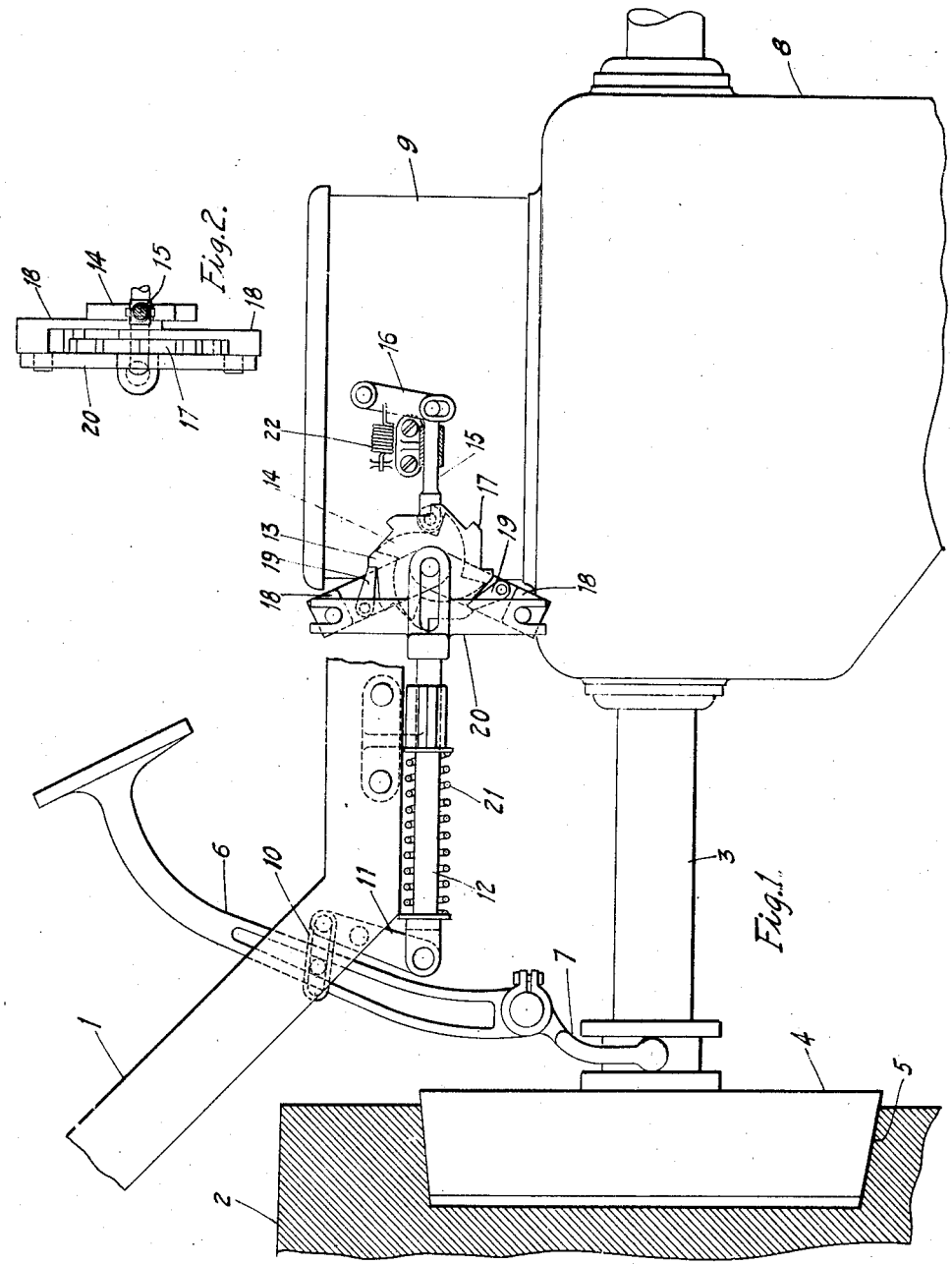
WITNESSES:
Chas. Fornander
J. R. Langley.
INVENTOR
Anton K. Kusebauch.
BY
Chesley G. Carr
ATTORNEY

UNITED STATES PATENT OFFICE.

ANTON K. KUSEBAUCH, OF PITTSBURGH, PENNSYLVANIA, ASSIGNOR TO WESTINGHOUSE ELECTRIC AND MANUFACTURING COMPANY, A CORPORATION OF PENNSYLVANIA.

GEAR-SHIFTING MECHANISM.

1,159,505.  Specification of Letters Patent.  Patented Nov. 9, 1915.

Application filed November 25, 1914. Serial No. 873,909.

*To all whom it may concern:*

Be it known that I, ANTON K. KUSEBAUCH, a citizen of the United States, and a resident of Pittsburgh, in the county of Allegheny and State of Pennsylvania, have invented a new and useful Improvement in Gear-Shifting Mechanism, of which the following is a specification.

My invention relates to gear-shifting mechanisms and particularly to controlling means therefor.

My invention has for its object to provide a simple and efficient arrangement whereby separate strokes of the clutch pedal may be employed in shifting the movable gear wheels of transmission mechanisms for changing the speed ratios.

In the operation of gear-shifting mechanisms whether manually operable or actuated by power devices, it has been found that, if the movable gear wheels of the transmission mechanism are shifted directly from one position to another for different speed ratios, there is a material difference in the speeds of the coacting gear wheels which are to be connected. As a result, the gear wheels do not mesh readily, and the clashing of the gear teeth, which occurs under such circumstances, causes their early destruction. The injury to the gear wheels occurs because insufficient time has elapsed between the disengagement of one pair of coacting gear wheels and the engagement of the second pair of coacting gear wheels, to permit the clutch brake to effect a decrease in speed of the movable member of the engine clutch and that part of the transmission mechanism which is connected to it.

It has been found that, if sufficient time intervenes between the connections for the different speed ratios, the gear wheels to be connected have substantially the same speed and their engagement may be effected without damaging them. In order to insure that the operator may allow sufficient time for the clutch brake to perform its function, it is essential to provide a mechanism for preventing the change from one speed ratio to another by a single stroke of the actuating mechanism.

According to the present invention, I provide a ratchet mechanism which is interposed between the gear-shifting mechanism and the clutch-pedal lever that is employed to actuate the gear-shifting mechanism. The ratchet mechanism is so arranged that the movable gear wheels of the transmission mechanism are shifted to a neutral position by the forward stroke of the pedal and are shifted into position for a different speed ratio by the return stroke of the pedal. By means of this arrangement, any desired interval may elapse between the separate operations.

In the accompanying drawings, Figure 1 is a view, partially in elevation and partially in section, of an automobile with my invention attached thereto. Fig. 2 is a side view of the ratchet mechanism.

An automobile 1, only a portion of which is shown, has an engine of which only a part of the fly wheel 2 is shown. A shaft 3 is connected to the fly wheel 2 by a movable clutch member 4 that is slidably mounted on the shaft 3 and a coacting clutch member 5 that is formed in the fly wheel 2. The movable clutch member 4 is controlled by a clutch-pedal lever 6 which is connected thereto by a yoke member 7.

The shaft 3 is connected to a transmission mechanism 8 which is shown diagrammatically. The transmission mechanism 8 may be any of the standard transmission mechanisms in which shiftable gear wheels are moved in opposite directions to connect the engine to the transmission shaft at different speed ratios. The transmission mechanism is controlled by a gear-shifting mechanism 9 which is also shown diagrammatically, since the details thereof form no part of the present invention.

The pedal lever 6 is connected to the gear shifting mechanism 9 by a link 10 with which it has a lost-motion connection, a pivoted lever 11, a rod 12, a pawl-and-ratchet mechanism 13, a cam 14, indicated by dotted lines (Fig. 1), a rod 15, and a lever arm 16. In actual practice, a portion of the means for connecting the cam 14 to the gear-shifting mechanism comprising the rod 15 may be omitted.

The ratchet mechanism 13, which is of the double acting type, comprises a toothed wheel 17 and two pivotally mounted arms 18 on which spring pressed pawls 19 are pivotally mounted. The arms 18 are actuated simultaneously in opposite directions about their point of pivotal support by a bar 20 that is connected to the rod 12.

Normally, the various parts are in their respective illustrated positions. It may be assumed that the vehicle is in operation and that it is desired to change the speed ratio at which the engine is connected to the driving wheel. The clutch lever 6 is pressed forwardly to first disengage the clutch members 4 and 5. This action may occur without affecting the mechanism to which it is connected by reason of its lost-motion connection with the link 10. Further actuation of the clutch lever beyond its clutch-disengaging position operates to shift the rod 12 to the right, as shown, against the force of a spring 21. The ratchet wheel 17 is then rotated by means of the bar 20, the upper arm 18 and the pawl 19, carried by it, the lower pawl 19 having a sliding engagement with the inclined surface of the adjacent tooth.

When the pedal lever is at the extremity of its forward movement, the ratchet wheel 17 and the cam 14, which is connected to it, have been rotated an angular distance corresponding to one tooth or one-eighth of a revolution. The rod 15 is actuated to the right, as shown, by the inclined surface of the cam teeth. When the parts have reached the position just described, the rod 15 will have been actuated through approximately one-half of its path of movement. The movable gear wheels of the transmission mechanism are now in their neutral positions.

After any desired interval has elapsed, the operator releases the clutch pedal and the spring 21 returns the rod 12, the bar 20 and the arms 18 to their normal positions. During the return movement, the lower of the pawls 19 engages the tooth with which it is then in register and the ratchet wheel 17 and the cam 14 are rotated in the same direction and through the same angle as above described in connection with the forward movement of the pedal. The rod 15 and the gear-shifting mechanism to which it is connected are then actuated to the extremity of their path of movement to shift the movable gear wheels for a different speed ratio.

When the ratchet wheel 17 and the cam 14 have completed approximately a quarter of a revolution, the inclined surface of the cam tooth has passed out of engagement with the rod 15, and the arm 16 and the rod 15 are returned to their respective illustrated positions by a spring 22. Further return movement of the clutch pedal operates to effect the engagement of the clutch members 4 and 5, and the vehicle will be driven at the selected speed ratio.

The ratchet mechanism permits the operator to delay the operation of the gear-shifting mechanism in changing either from a higher to a lower speed ratio or vice versa. For example, in changing from third speed to second speed, it is necessary to allow sufficient time either for the engine to accelerate the clutch and the gear wheel connected to it, or for the car to slow down and thus reduce the speed of the transmission mechanism. The gear wheels to be meshed then have approximately the same speed and may be easily connected.

It will be noted that I provide an arrangement whereby a gear-shifting mechanism, which accomplishes a change in speed ratios by a unidirectional movement, may be operated in steps by the usual clutch-pedal lever, and any desired interval may elapse between the separate steps.

I claim as my invention:

1. The combination with a gear shifting mechanism, and an actuating member therefor, of a double acting pawl and ratchet mechanism for connecting said member to said gear shifting mechanism.

2. The combination with a gear shifting mechanism, and an actuating member therefor, of means whereby movements of said member in opposite directions produce a unidirectional movement of said gear shifting mechanism.

3. The combination with a gear shifting mechanism, and a controlling lever therefor, of means for connecting said lever to said mechanism whereby said mechanism is actuated in the same direction by reverse movements of said lever.

4. The combination with a gear shifting mechanism, and a controlling lever therefor, of means comprising a double acting ratchet device for actuating said gear shifting mechanism in the same direction upon movements of said lever in reverse direction.

In testimony whereof, I have hereunto subscribed my name this 14th day of Nov. 1914.

ANTON K. KUSEBAUCH.

Witnesses:
H. A. REINHOLD,
B. B. HINES.